(12) United States Patent
Gutierrez

(10) Patent No.: US 8,431,875 B2
(45) Date of Patent: Apr. 30, 2013

(54) METHOD FOR THE SYNCHRONIZATION OF INDUCTION COILS SUPPLIED BY POWER CONVERTERS OF AN INDUCTION COOKING HOB AND INDUCTION HEATING SYSTEM CARRYING OUT SUCH METHOD

(75) Inventor: Diego Neftali Gutierrez, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 542 days.

(21) Appl. No.: 12/687,307

(22) Filed: Jan. 14, 2010

(65) Prior Publication Data

US 2010/0181301 A1 Jul. 22, 2010

(30) Foreign Application Priority Data

Jan. 16, 2009 (EP) ..................................... 09150702

(51) Int. Cl.
*H05B 6/08* (2006.01)
*H05B 6/04* (2006.01)

(52) U.S. Cl.
USPC ......................................... 219/620; 219/660

(58) Field of Classification Search .................. 219/660, 219/662, 620, 624, 476, 656, 671
See application file for complete search history.

(56) References Cited

U.S. PATENT DOCUMENTS

2004/0245244 A1* 12/2004 Hirota et al. .................. 219/624
2006/0237450 A1* 10/2006 Uchida et al. ................. 219/662
2007/0135037 A1  6/2007 Barragan Perez et al.

FOREIGN PATENT DOCUMENTS

JP   2005528594    * 10/2005
WO  2007/048700 A1  5/2007

OTHER PUBLICATIONS

Translation of JP2005-285594 A (Oct. 2005), 5 pages.*

* cited by examiner

*Primary Examiner* — Caridad Everhart
(74) *Attorney, Agent, or Firm* — Diederiks & Whitelaw PLC

(57) ABSTRACT

A method for the synchronization of induction coils supplied by power converters and acting on a common heating zone or on adjacent heating zones of an induction heating system, particularly of an induction cooking hob, comprises the steps of activating a first power converter, detecting a parameter correlated to the magnetic field generated by the first power converter and activating a second power converter by using the parameter as synchronization signal, the parameter being induction coil voltage or induction coil current or a combination thereof.

9 Claims, 6 Drawing Sheets

Dual zone

Bridge

Expandable

Bridge with Expandable

Dual zone

Bridge

Expandable

Bridge with Expandable

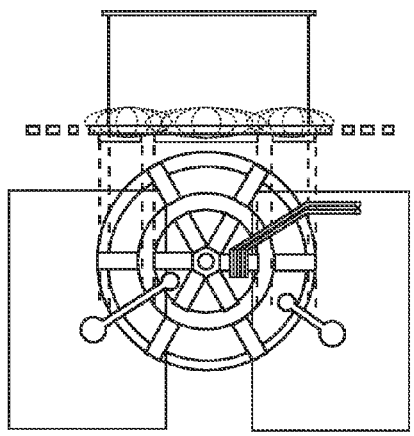
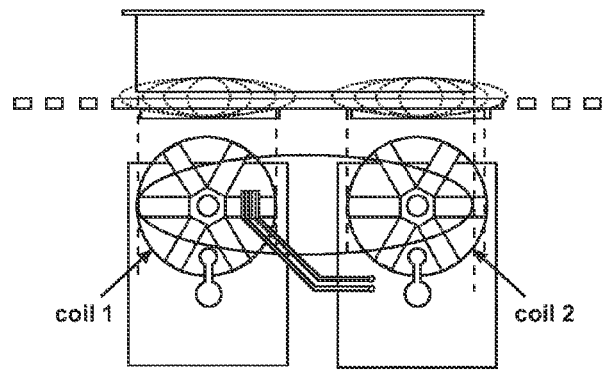
Fig. 4            Fig. 5
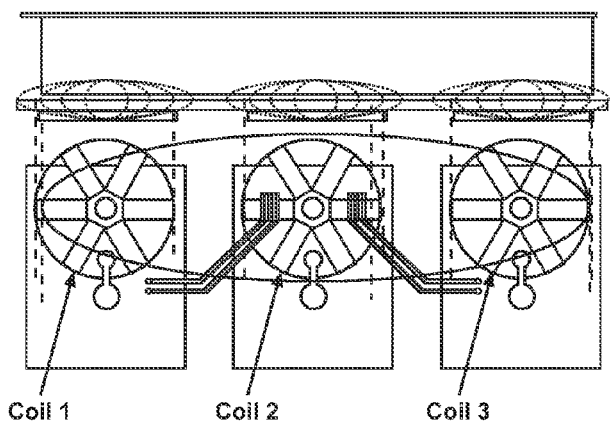
Fig. 6

METHOD FOR THE SYNCHRONIZATION OF INDUCTION COILS SUPPLIED BY POWER CONVERTERS OF AN INDUCTION COOKING HOB AND INDUCTION HEATING SYSTEM CARRYING OUT SUCH METHOD

BACKGROUND OF THE INVENTION

1. Field of the Invention

The present invention relates to a method for the synchronization of induction coils supplied by different power converters and capable of acting on a common heating zone of an induction heating system, particularly an induction cooking hob, or capable of acting on different adjacent heating zones. The present invention relates as well to an induction heating system, particularly an induction cooking hob which can carry out the above method. In the above kind of induction heating systems it is necessary to synchronize induction coils, powered by different power converters, whose generated electromagnetic (EM) fields are mutually linked due to coils proximity or due to dual zone configuration (for instance two coils concatenated: an inner coil and outer coil). This configuration is highly problematic because the interference between the coils can generate vibrations in the range of audible frequencies, highly unpleasant for the user.

By synchronizing the coils, i.e. by synchronizing the switching of the power transistors of the power converters supplying the coils, the generation of noise during normal operation can be prevented, and the comfort of the user is guaranteed.

The present invention relates particularly to all the configurations where the load (i.e. a metal cooking vessel) receives power from multiple induction coils, and such coils are powered by different power converters and the EM fields generated by at least two coils are mutually linked.

The attached FIG. 1 shows some example of configurations of load heated by multiple coils.

2. Description of the Related Art

An induction heating system consists of a source of alternating electromagnetic flux coupled with a load, typically a ferromagnetic vessel. Eddy currents induced in the bottom of the vessel are dissipated for Joule effect, becoming heat that warms up the coil.

The electromagnetic coupling involves mechanical vibrations of the vessel. These vibrations have the same frequency as the electromagnetic flux: actual frequency ranges adopted in induction hobs are always above the audible range, therefore there is no generation of acoustic noise for the user.

If multiple sources of alternating electromagnetic flux are coupled with the same vessel, the use of frequencies above the audible range is not enough to ensure the absence of acoustic noise. If two sources are not synchronized, the superposition of the two waves on the vessel generates interference waves with different frequencies, which can fall into the audible range.

A typical interference is the beat, i.e. an interference whose frequency is the difference between the frequencies $f_1$ and $f_2$ of the two main signals. If two waves $y_1$ and $y_2$ have slightly different frequencies, or they're not synchronized, their superposition $y_1+y_2$ generates a beat with a period $T_{beat}$ much greater than the periods of $y_1$ and $y_2$, as shown in FIG. 2.

For avoiding the problem, real applications must guarantee the synchronization of all the sources (coils) coupled with the same load (vessel). If such sources are powered by the same power converter the problem is quite simple: being the frequency generator (typically a microcontroller with a clock generator) the same for all the sources, it is enough that the coils are supplied at the same frequency at every time.

If the coils are powered by different power converters (with different frequency generators) the application of the same frequency is not enough: being the frequency generators independent, they are not synchronized, unless a synchronization mechanism is provided.

The problem of the acoustic noise due to beat generation, highly probable when multiple coils, supplied by different power converters, are coupled with the same load, is well known in the art of induction heating system, particularly for their applications to cooking appliances.

A solution is shown in WO-A-2007/048700 which discloses a direct link between the power converters, i.e. a cable that connects the microcontrollers of the converters, or their clock sources, or the control signals of the power transistors, and such cables send a signal from a first power converter (master) to the other (slave) that serves as a synchronization for the generation of the pulse width modulation driving signals for converters.

This known solution presents some drawbacks since the connection between microcontrollers implies the use of shielded cables and it increases the overall cost of the appliance. Moreover such known solution implies also a direct electrical link between the two power converters, which can create problems of reliability and electrical insulation.

Another solution is known from US-A-2007/0135037 which discloses a way to operate two induction coils jointly by means of one converter circuit with two outputs, each of the output being connected to an induction coil. The converter circuit is operated in such a way that the frequency of the noise generated by the superposition of the two different switching frequencies is outside the human audibility range of frequencies. This solution makes the circuit more complex and somehow limits the possibility to change the switching frequencies of the converters in a sufficiently wide range.

SUMMARY OF THE INVENTION

An aspect of the present disclosure is to provide a new synchronization method which does not present the above problems and which is simple and reliable to be implemented.

According to the disclosure, the above object is reached thanks to the features listed in the appended claims.

The present disclosure suggests a new method to synchronize the power converters, and hence to avoid the problem of beating. With the term "power converters" we mean also a single power converter with two or more outputs, each of such output being connected to an induction coil. The present invention proposes a different approach for solving the problem of two or more coils synchronization: no direct link between the power converters or portions of a converter linked to different induction coils, but, instead, the capability of one power converter to determine the other coil drive frequency by measuring at least one electrical parameter generated by it.

BRIEF DESCRIPTION OF THE DRAWINGS

Further features of a method and an induction heating system according to the invention will become clear from the following detailed description, with reference to the attached drawings in which:

FIG. 4 is showing the embodiment of FIG. 3 applied to a dual concentric zone;

FIG. 5 is similar to FIG. 4 and shows the application to a so called "bridge" configuration in which two induction coils are adjacent and used to heat a common cooking utensil;

FIG. 6 is similar to FIG. 5 and show the application to a configuration in which three induction coils are adjacent to each other;

DETAILED DESCRIPTION OF THE PREFERRED EMBODIMENTS

Figure 1:
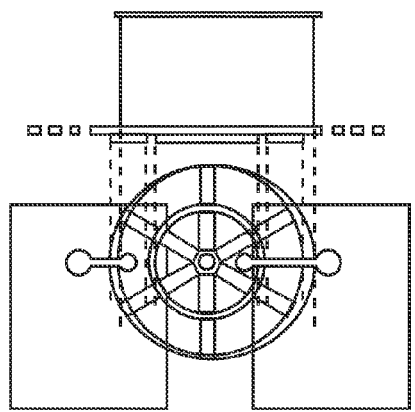
FIG. 1 is a typical configuration of an induction cooking hob where pan is heated by multiple induction coils, with the coils powered by different converters.
Figure 1:
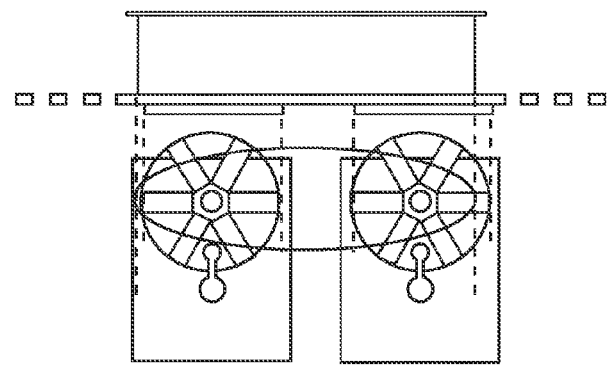
Figure 1:
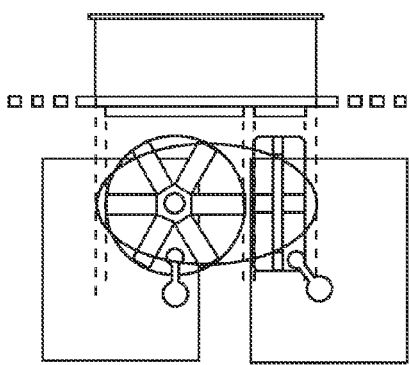
Figure 1:
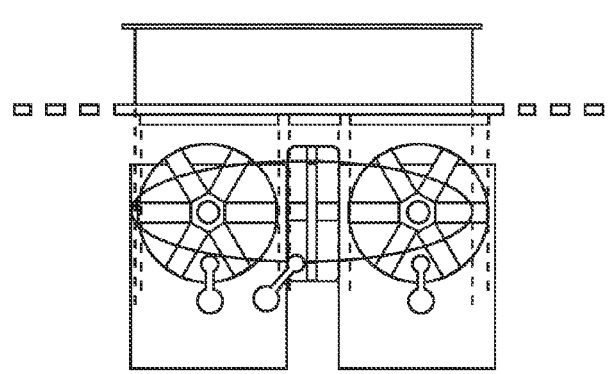
Figure 2:
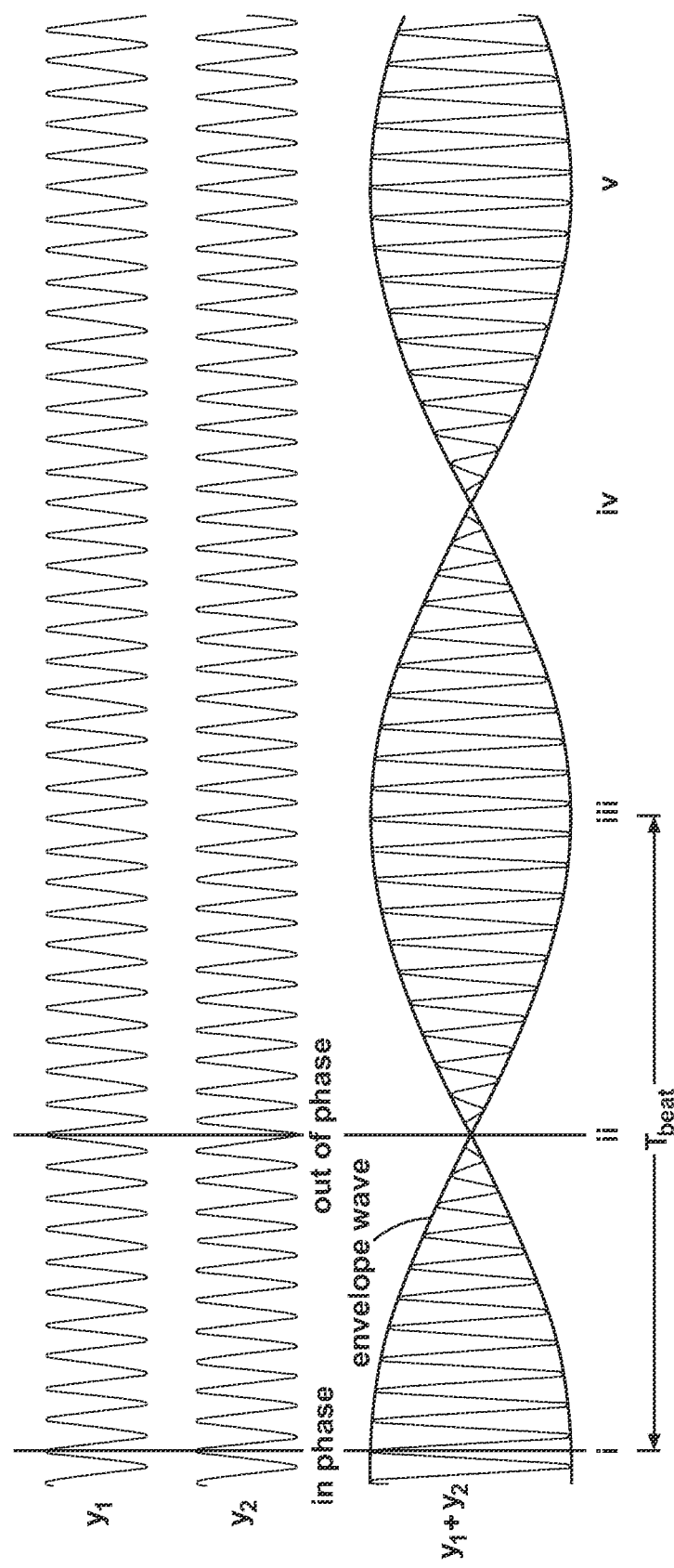
FIG. 2 is showing how two signals not synchronized can generate a beat with much lower frequency.

The invention proposes to synchronize the power converters by allowing a converter to measure at least one electrical parameter of a coil supplied by one reference converter, and to synchronize its output with this signal. For doing so the electrical parameter must be synchronized with the coil EM field generated that induces eddy currents in the vessel bottom. The start up sequence for such a system with N power converters is:

Power converter 1 (reference) starts delivering power. The other power converters are off.

Other power converters (2–N) acquire an electrical parameter of the coil 1 and synchronize their internal frequency generators (timers) with the signal from coil 1.

Once the timers are synchronized, power converters (2–N) start delivering power.

The synchronization time, i.e. the time required for each converter to measure the signal from the coil already active and to start delivering power with a synchronized frequency is sufficiently short (less than one second) so that it doesn't imply any lack of usability.

After that start up sequence is completed, all the power converters keep measuring the signals from the reference coil, in order to verify if their outputs are still synchronized to the reference converter: whenever a power converter not driving the reference coil detects that its output is no more synchronized with the signal from the reference coil, it synchronizes again its internal timers with the reference signal. The "re-synchronization" is carried out continuously due to the fact that the converter of the reference coil will change drive frequency for keeping the power supply constant (when power is controlled by changing frequency)

Suitable electrical parameters of the coil to be measured for synchronization are coil voltage, coil current or any other parameters that is correlated to these ones. The magnetic flux generated by the induction coil current can be used. For sensing the magnetic flux it is preferably used a sensor of the magnetic flux that is concatenated by the magnetic field concentrators, usually in the form of ferrite bars, of the reference coil. Even if the use of a sensor associated to a magnetic field concentrator is preferred, nevertherless a simple coil (or several turns of conductive wire wrapped as a coil) affected by the magnetic field changes can be used as a sensor as well.

This parameter is easy to measure also on induction coils not directly connected to the measuring power converter: it can be measured by adding a measuring coil in the form, for instance, of a conductive wire wrapped around a ferrite bar. Ferrite bars are preferred components due to high relative permeability [μ rel] and high electrical resistivity ρ and are commonly applied in a radial pattern under the induction coils for concentrating the magnetic flux. Ferrites are well known non-conductive ferromagnetic ceramic compounds derived from iron oxides such as hematite or magnetite as well as oxides of other metals. However, any other available sensor that transduces the flux magnetic into some electrical magnitude that uses high relative permissibility material can be used. Moreover, other sensors based on different technology (i.e. hall-effect sensor) that transducer flux magnetic into some electrical magnitude and is placed within the electromagnetic field generated by the induction coil can be used as well.

Figure 3:
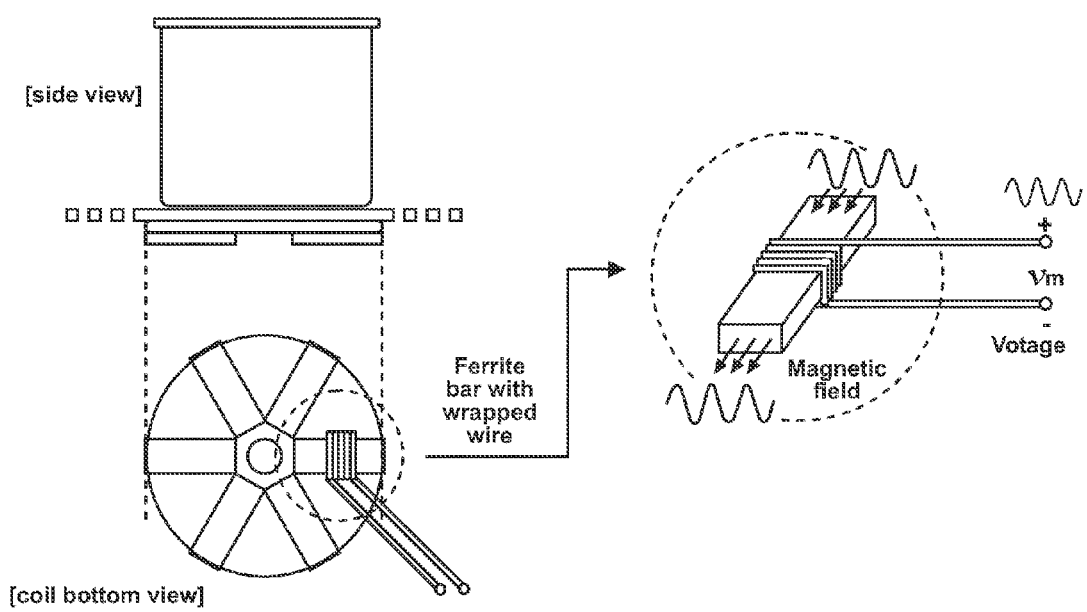
FIG. 3 is a schematic view of a preferred embodiment of the invention in which a measurement system is used for measuring indirectly the magnetic filed generated by the coil current of a first power converter.

FIG. 3 shows an example of application of a ferrite bar as a magnetic flux sensor.

The voltage $v_m$ induced on the wire wrapped around the ferrite is proportional to the variation of the magnetic field, according to Faraday's law (where N is the number of turns of wire and $\Phi_B$ is the magnetic flux):

$$v_m = -N \frac{d\Phi_B}{dt}$$

The magnetic flux that is linked to the wire wrapped around the ferrite is generated by the coil current:

$$\frac{d\Phi_B}{dt} = M \frac{di_{coil}}{dt}$$

where M is the mutual inductance between the induction coil and the magnetic flux.

As the coil voltage and the voltage $v_m$ induced on the wire depends on the derivate of the induction coil current:

$$v_{coil} = -L \frac{di_{coil}}{dt}$$

$$v_m = -M \frac{di_{coil}}{dt}$$

Therefore the voltage $v_m$ induced on the wire is related to coil voltage:

$$v_{coil} \alpha (v_m)$$

hence the signal $v_m$ can be used for the synchronization of the power converters.

Figure 7A:
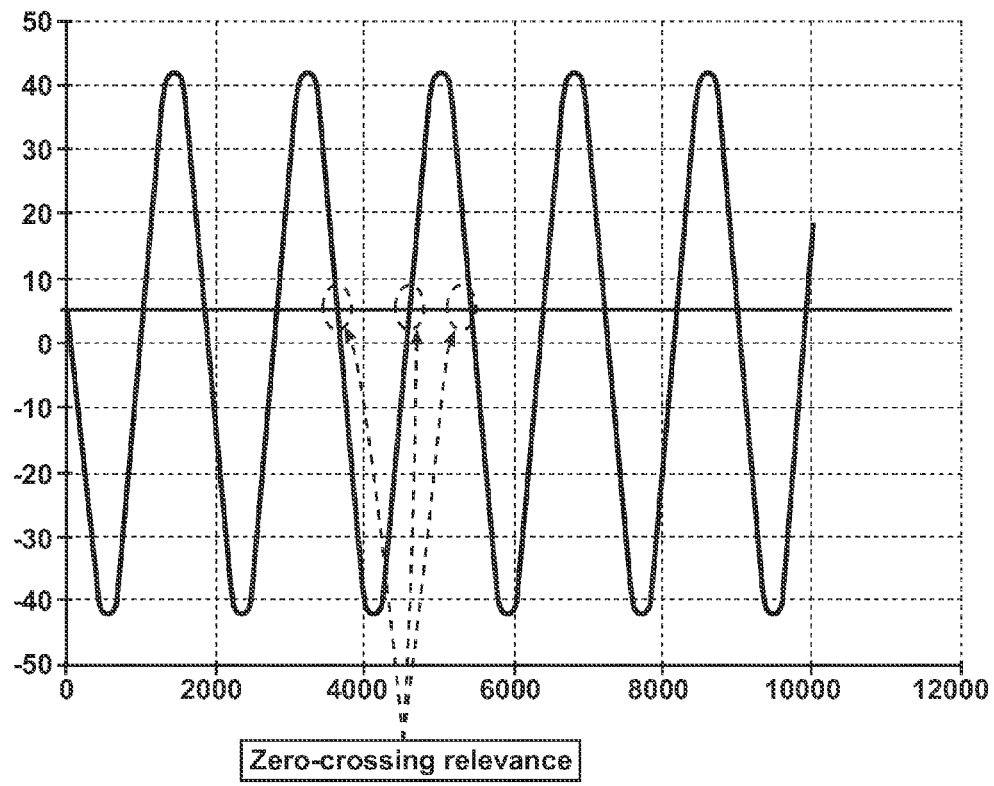
FIGS. 7a and 7b show how the synchronization of a second power converter is based on a zero-crossing detection circuit.
Figure 7B:
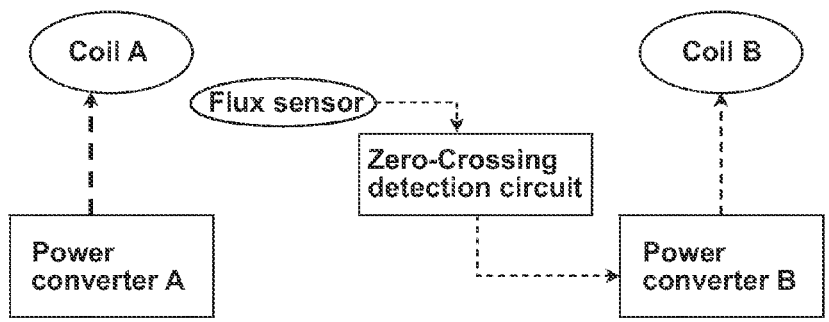

For instance, in FIG. 7a it is shown the Vm induced on the wire wrapped around the coil. The zero crossing of the Vm can serve as the reference time instant for the synchronization of power transistor signal. The detection of zero-crossing time instant is carried out with an electrical signal conditioning circuit which is already applied in today standard control board for white-good appliance market.

Thus, the period of the power converter that is sensed can be calculated directly considering the time intervals between consecutive Vm zero-crossing.

FIGS. 4, 5 and 6 show examples of implementation of the invention with 2 and 3 power converters. The parameter measured for synchronization is the magnetic flux in the coil ferrite bar (i.e. the voltage $v_m$ induced on the wrapped wire).

In FIGS. 4 and 5 the two power converters start-up sequence is as follows:

Reference=coil 1

Power converter 2 acquires a synchronization signal from coil 1

Power converter 2 synchronizes its timers with the signal

Power converter 2 starts delivering power with same frequency that uses converter 1.

In FIG. 6 the three power converters start-up sequence is as follows:

Reference=coil 2

Power converters 1 and 3 acquire a synchronization signal from coil 2

Power converters 1 and 3 synchronize their timers with the signal

Power converter 1 and 3 starts delivering power with same frequency that uses converter 1.

It is important to notice that by using the magnetic flux induced in a coil ferrite bar as reference electrical parameter, no electrical connection between power converters is required and they are electrically isolated.

Figure 8:
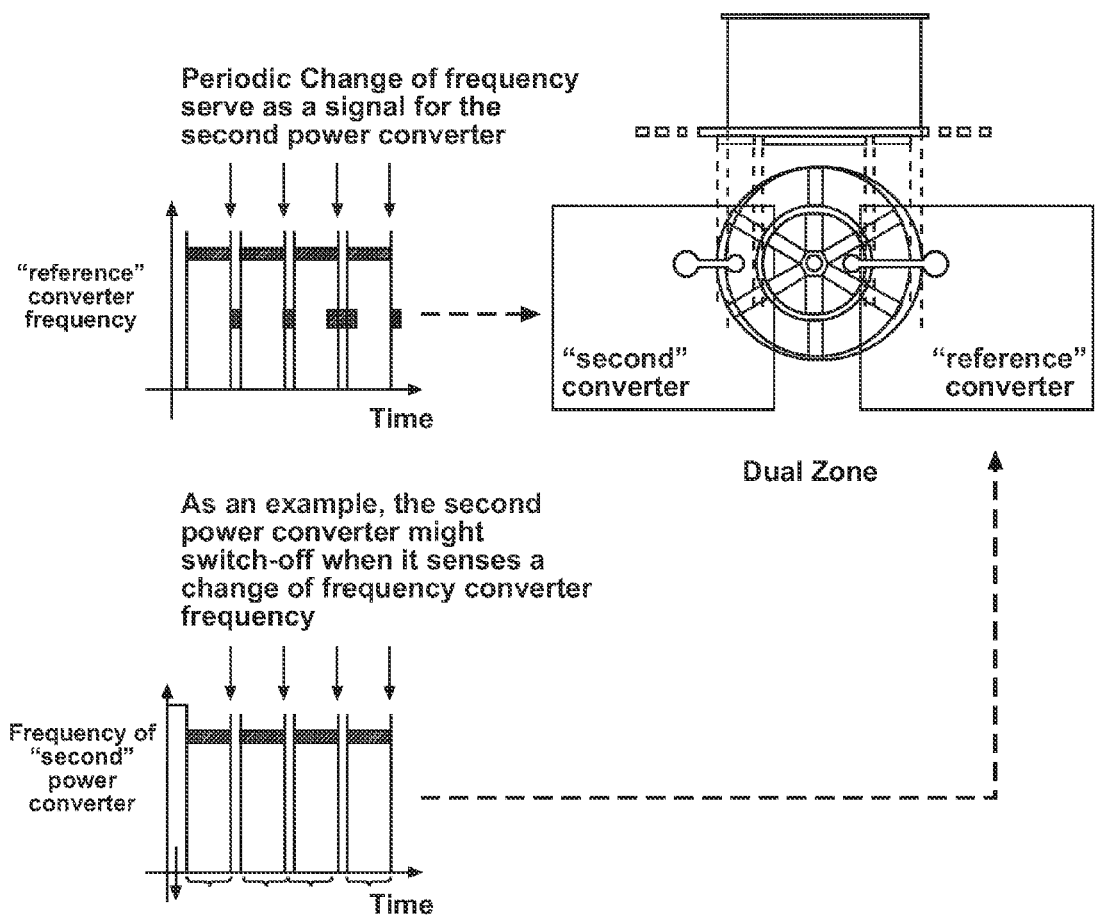
FIG. 8 shows a different use of a frequency change in the reference converter as synchronisation signal for the second converter, in a dual zone configuration.

Moreover, the change of frequency of the reference power converter can be used as an event signal for triggering specific functions for the second power converter that executes a special task (see FIG. 8). FIG. 8 relates to a special function of boiling detection where an electrical parameter is sensed at a predetermined constant frequency by the reference power converter. The periodic change of frequency is used as a signal for the second power converter: at that point the second power converter changes the functioning mode as defined by specific function. For instance, in case of dual zone coil topologies, once it detects a fixed change of frequency of the reference power converter, the second power converter may be switched off for allowing the reference power converter to sense a less-distorted electrical parameter sensed value (in a dual Zone configuration, the magnetic cross-conduction between inner and outer coil distorts the correlation between converter electrical parameters and the pot bottom temperature)

Furthermore, other different type of information/message between converters can be implemented by using the change of frequency and the intervals between such changes as way of representing bits as today standard protocols of communication.

The invention claimed is:

1. A method for synchronizing magnetic fields generated by induction coils supplied by power converters and acting on a common heating zone or on adjacent heating zones an induction cooking hob, comprising:

activating a first power converter to cause a first induction coil to generate a first magnetic field having a first frequency;

detecting a parameter correlated to the first magnetic field generated by said first power converter;

activating a second power converter, after detecting the parameter, to cause a second induction coil to generate a second magnetic field having a second frequency; and using said parameter as a synchronization signal to synchronize the second frequency with the first frequency.

2. The method according to claim 1, wherein the parameter is an induction coil voltage of the first induction coil or an induction coil current of the first induction coil or a combination thereof.

3. The method according to claim 1, wherein the parameter is measured on a sensing circuit.

4. The method according to claim 3, wherein the sensing circuit is associated with a magnetic field concentrator of the first induction coil.

5. The method according to claim 3, wherein the parameter is a voltage $V_m$ induced on the sensing circuit formed as a wire wrapped around a magnetic field concentrator, according to Faraday's law:

$$v_m = -N \frac{d\Phi_B}{dt}$$

where N is the number of turns of the wire, and $\Phi_B$ is a magnetic flux through the magnetic field concentrator.

6. The method according to claim 5, wherein a zero crossing of the voltage (Vm) induced on the sensing circuit is used as a reference for the synchronization signal.

7. An induction heating system for a cooking appliance comprising:

a first induction coil and a second induction coil supplied by a first power converter and a second power convertor respectively and defining a common heating zone or adjacent heating zones;

a detector for detecting a parameter correlated to a magnetic field generated by the first power converter;

a synchronizor for delivering the parameter as a synchronization signal to the second power converter;

a magnetic field concentrator associated with the first induction coil, wherein the detector comprises at least one sensing circuit associated with the first induction coil and including a wire wrapped around the magnetic field concentrator.

8. The induction heating system according to claim 7, wherein the parameter is an induction coil voltage of the first induction coil or induction coil current of the first induction coil or a combination thereof.

9. The induction heating system according to claim 7, wherein the magnetic field concentrator is a ferrite bar arranged with other ferrite bars disposed in a radial pattern and facing the first induction coil.

* * * * *